United States Patent
Isogai

(10) Patent No.: US 8,515,252 B2
(45) Date of Patent: Aug. 20, 2013

(54) RECORDING/REPRODUCING APPARATUS, VIDEO DISPLAY APPARATUS, SYSTEM AND METHOD FOR STARTING APPARATUS ON NETWORK

(75) Inventor: Hiroyuki Isogai, Matsudo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 87 days.

(21) Appl. No.: 13/205,091

(22) Filed: Aug. 8, 2011

(65) Prior Publication Data

US 2012/0082429 A1    Apr. 5, 2012

(30) Foreign Application Priority Data

Sep. 30, 2010 (JP) .................................. 2010-222387

(51) Int. Cl.
*H04N 5/94* (2006.01)
*H04N 9/88* (2006.01)
*H04N 5/93* (2006.01)
*H04N 9/80* (2006.01)

(52) U.S. Cl.
USPC ........... 386/277; 386/263; 386/326; 386/353; 386/239; 386/248

(58) Field of Classification Search
USPC .................. 386/277, 263, 326, 353, 239, 248
See application file for complete search history.

(56) References Cited

U.S. PATENT DOCUMENTS

| 8,099,612 B2 | 1/2012 | Tomita | |
|---|---|---|---|
| 2008/0285942 A1* | 11/2008 | Yamadaji | 386/83 |
| 2011/0047394 A1* | 2/2011 | Sato | 713/310 |

FOREIGN PATENT DOCUMENTS

| JP | 2007-81519 | 3/2007 |
|---|---|---|
| JP | 2008-034907 | 2/2008 |
| JP | 2009-199283 | 9/2009 |
| JP | 2009-284116 | 12/2009 |
| JP | 2010-206675 | 9/2010 |

OTHER PUBLICATIONS

Japanese Office Action for corresponding Japanese Application No. 2010-222387, Mailed Jan. 17, 2012, in 6 pages.

* cited by examiner

*Primary Examiner* — Daquan Zhao
(74) *Attorney, Agent, or Firm* — Knobbe Martens Olson & Bear LLP

(57) ABSTRACT

According to one embodiment, a video display apparatus including, a monitoring module, LAN-connected to a command supplier, configured to monitor a start state of a power unit which is and turned on when receiving a start command, and a controller, LAN-connected to a command supplier, configured to detect that the start command is transmitted to a power unit which and turned on when receiving the start command, and configured to supply a start signal to the power unit via a bidirectional interface when the power unit does not start after a predetermined time elapses.

9 Claims, 5 Drawing Sheets

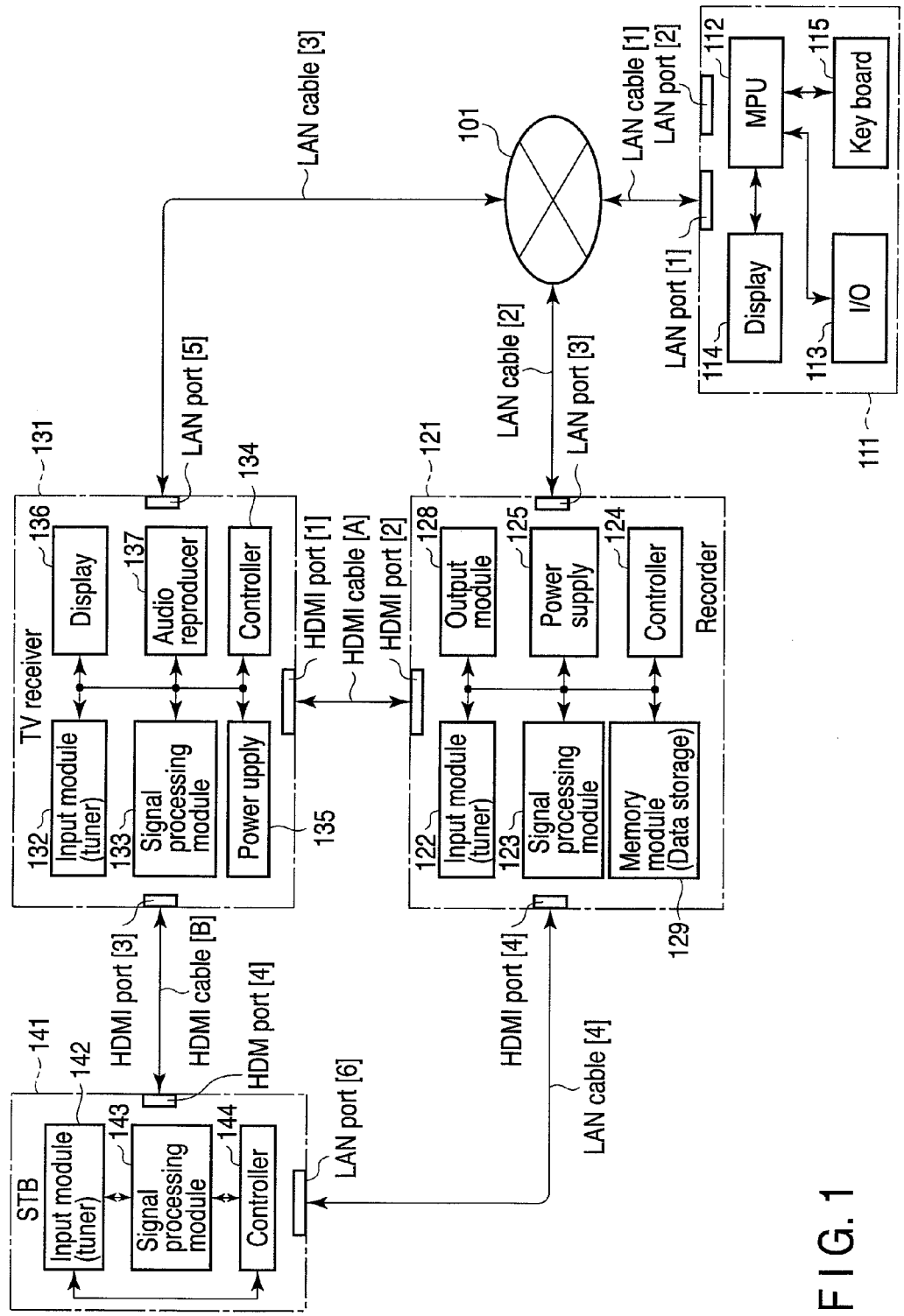
F I G. 1

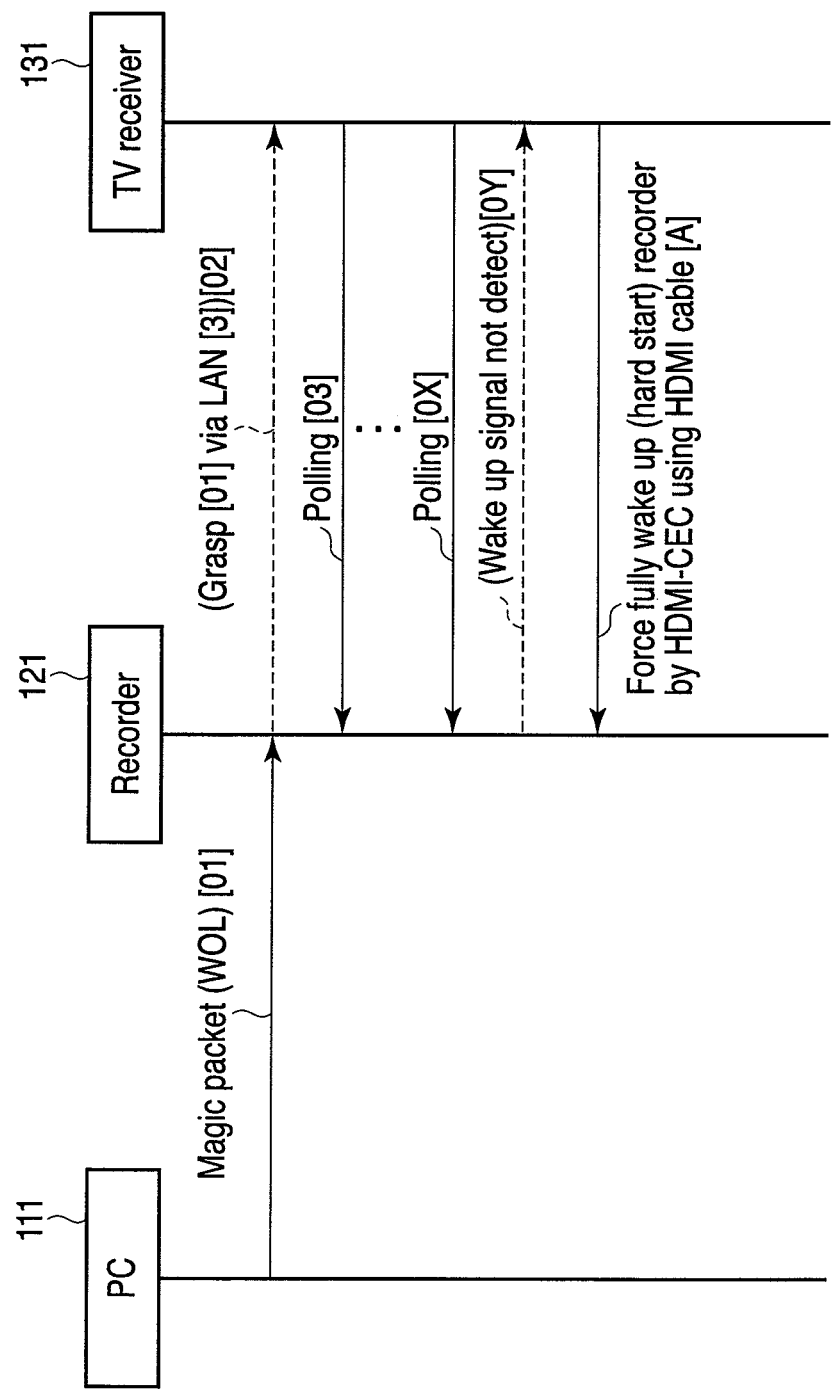
F I G. 3

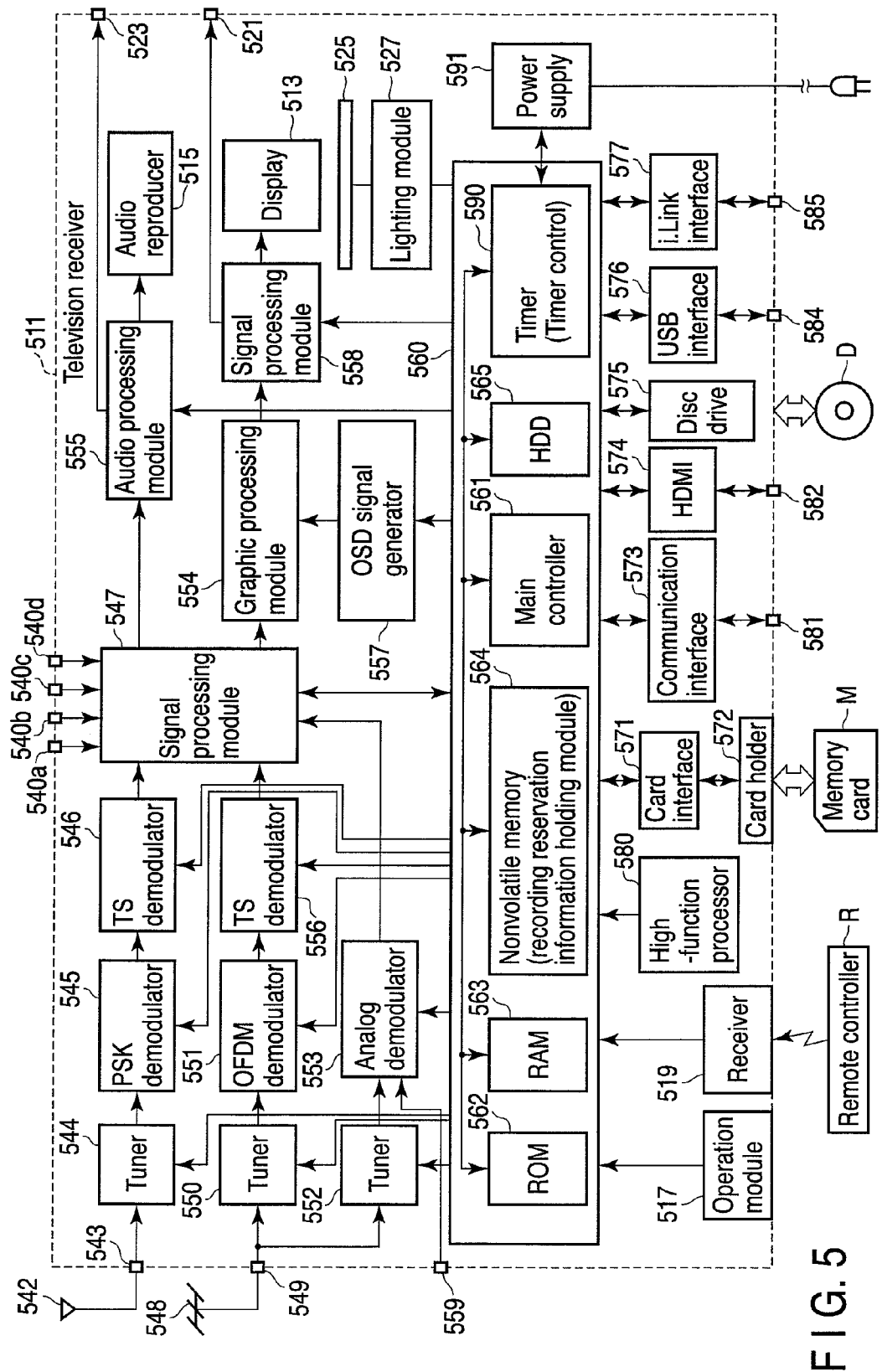
F I G. 5

RECORDING/REPRODUCING APPARATUS, VIDEO DISPLAY APPARATUS, SYSTEM AND METHOD FOR STARTING APPARATUS ON NETWORK

CROSS-REFERENCE TO RELATED APPLICATIONS

This application is based upon and claims the benefit of priority from Japanese Patent Application No. 2010-222387, filed Sep. 30, 2010; the entire contents of which are incorporated herein by reference.

FIELD

Embodiments described herein relate generally to a recording/reproducing apparatus, which is connected to a video display apparatus via a bidirectional communication interface, and to system and method for starting an apparatus on a network.

BACKGROUND

The High-definition Digital Media Interface (HDMI) is widely used as a bidirectional communication interface.

Moreover, a recording/reproducing apparatus is connected to a video display apparatus via a local area network (LAN) in addition to a connection using the HDMI. For example, it is possible to reproduce content held in a recording/reproducing apparatus, that is, video and audio (generally called a program) using a personal computer (PC).

In the connection using an HDMI, the following HDMI Ethernet Channel (HEC) version 1.4 is established following the Consumer Electronics Control (CEC) standard established later. According to the HEC, a control signal is transferable via Audio Return Channel (ARC) version 1.4 and Ethernet (registered trademark).

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary diagram showing a example of a configuration of a system according to an embodiment;

FIG. 3 is an exemplary diagram showing an example of a view to explain polling according to an embodiment;

FIG. 5 is an exemplary diagram showing an example of a configuration of a television receiver according to an embodiment.

DETAILED DESCRIPTION

Figure 2:
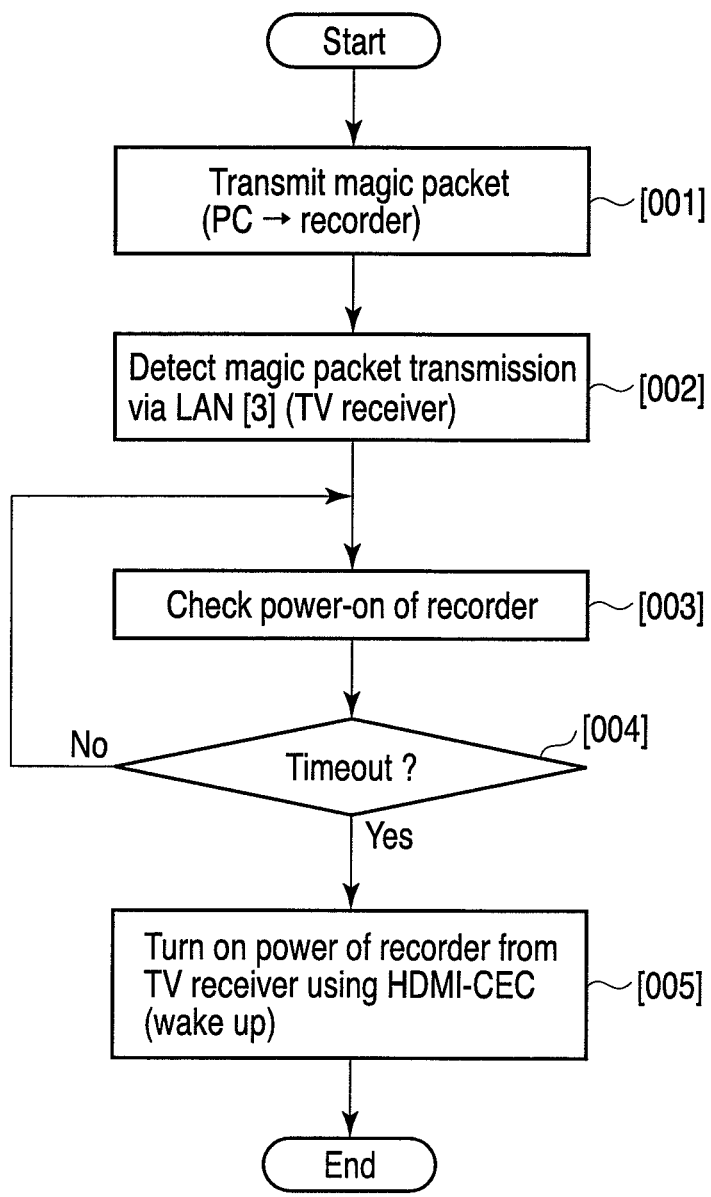
FIG. 2 is an exemplary diagram showing an example of a method of starting an apparatus according to an embodiment.

Various embodiments will be described hereinafter with reference to the accompanying drawings. In general, according to one embodiment, a video display apparatus comprising: a monitoring module, LAN-connected to a command supplier, configured to monitor a start state of a power unit which is and turned on when receiving a start command; and a controller, LAN-connected to a command supplier, configured to detect that the start command is transmitted to a power unit which and turned on when receiving the start command, and configured to supply a start signal to the power unit via a bidirectional interface when the power unit does not start after a predetermined time elapses.

Embodiments will now be described hereinafter in detail with reference to the accompanying drawings.

FIG. 1 shows an example of a connection of a recording/reproducing apparatus, a video display apparatus and an apparatus connected via a network according to an embodiment. The foregoing connection is made in a closed network (e.g., local area network [LAN]) given as a typical example of a home and a small-scale business office. For example, a personal computer (PC) 111, a recording/reproducing apparatus (e.g., recorder) 121 and a video display apparatus (e.g., a television [TV] receiver) 131 are connected by means of a router or server 101. Various components/configurations referred to as "module" described below may be obtained by hardware or may be obtained by software using, for example, a microcomputer (processor or CPU).

In the network shown in FIG. 1, the PC 111 connected to the router (server) 101 by means of a LAN cable is able to supply a predetermined control signal to the router 101 and the recording/reproducing apparatus 121 connected to a LAN cable. For example, a command for realizing a magic packet defined in an operating system (OS) of the PC 111, that is, wake-on-LAN (WOL) is given as the control signal. According to the connection shown in FIG. 1, the router 101 is connected to the TV receiver 131 by means of a LAN cable, as described above. Moreover, the recorder 121 is connected by means of an HDMI cable conforming to High-definition Digital Media Interface-Consumer Electronics Control (HDMI-CEC). In this case, the recorder 121 is connected to an external tuner connected to the TV receiver 131 via an HDMI cable, for example, a set-top box (STB) 141. Therefore, in a state that content supplied by a channel or external input selected by the STB 141, that is, a program (video and audio/voice) is displayed on a screen of the TV receiver 131, recording reservation is possible with respect to the recorder 121 previously designated as a recording target. Moreover, the PC 111 starts (turns on the power of) the recorder 121 so that the recorder 121 records receivable content.

The PC 111 includes a main controller (MPU) 112, an input/output (I/O) device 113, a display (display unit) 114 and a keyboard 115. Further, the PC 111 includes at least one LAN port [1] and LAN port [2]. In addition, the PC 111 transmits a magic packet peculiar to an operation system (OS) to an apparatus having a wake-on-LAN (WOL) function to turn on the power of a target apparatus.

The recorder 121 includes an input module (tuner) 122, a signal processing module 123, a controller 124, a power unit 125, an output module 128 and a memory module 129. Specifically, the tuner (input module) 122 accepts a video signal and an audio signal, that is, an input signal. The signal processing module 123 executes encoding for storing an input signal and decodes a stored signal. The controller 124 controls the operation of each unit of the recorder 121. The output module 128 outputs a stored signal to a monitor and an audio output (AV amplifier). The memory module 129 stores encoded video signal and audio signal.

When receiving a magic packet peculiar to an operating system (OS) of the PC 111, the power unit 125 turns on the power of the recorder 121 via wake-on-LAN (WOL). The memory module 129 includes at least one of a hard disk drive (HDD), an optical disk drive, which is capable of writing to an optical disk and read from an optical disk (stored with video and audio) and a semiconductor memory such as a secure digital (SD) card. Moreover, the recorder 121 includes at least one HDMI port [2] and at least one LAN port [3] and LAN port [4].

The TV receiver 131 includes an input module (tuner) 132, a signal processing module 133, a controller 134, a power unit 135, a display (a monitor) 136 and a reproducer (e.g. speaker) 137. Specifically, the tuner (input module) 132 accepts a video signal and an audio signal, that is, an input signal. The signal processing module 133 separates video and audio from the input signal, and utilizes audio for an analog signal conversion. The controller 134 controls the operation of each unit of the TV receiver 131. The monitor 136 displays a video. The reproducer 137 reproduces audio converted into an analog signal. Moreover, the TV receiver 131 includes at least one HDMI port [3] and at least one LAN port [5]. The controller 134 grasps the power state of the recorder 121 by means of HDMI-CEC.

The STB 141 includes an input module (tuner) 142, a signal processing module 143, a controller 144. Specifically, the tuner (input module) 142 accepts a video signal and an audio signal, that is, an input signal. The signal processing module 143 separates video and audio from the input signal, and utilizes audio for an analog signal conversion. The controller 144 controls the operation of each unit of the STB. Moreover, the STB 141 includes at least one HDMI port [4] and at least one LAN port [6]. In addition, the STB 141 sets recording reservation with respect to a LAN-connected apparatus (recorder).

According to the connection shown in FIG. 1, the PC 111 gives instructions to record content, that is, the start of the recorder 121 to the recorder 121 via the router 101. However, there is the case of failing in the start of the recorder 121 (i.e., the recorder 121 does not start) due to any reason. In other words, there is the case where the foregoing WOL function does not function resulting from a transmission error of a magic packet and a reception error thereof on the side of the recorder 121.

On the other hand, the TV receiver 131 acquires a media access control (MAC) address of the recorder 121 connected via an HDMI cable [A] using the HDMI-CEC function.

Therefore, when the PC 111 transmits a magic packet for turning on the power of the recorder 121, the TV receiver 131 holds a magic packet sent to the TV receiver 131 (from PC 111) via a LAN connection (broadcast). Thus, the TV receiver 131 recognizes that the power of the recorder 121 is turned on.

Under such a connection environment, the TV receiver 131 detects that the power of the recorder 121 is turned on by means of polling of the HDMI-CEC function (TV receiver 131 polls the power state of the recorder 121).

Therefore, the TV receiver 131 is able to detect the following power states of the recorder 121 if the power of the recorder 121 is turned on when polling the power state of the recorder 121 for a predetermined period. For example, one is a state that a LAN terminal is not operated by means of HDMI-HDMI Ethernet Channel (HDMI-HEC). Another is a state that the power of the LAN terminal is not turned on. Another is a state that a LAN cable is disconnected (pulled off).

As described above, the TV receiver 131 detects from the PC (external device) 111 that the recorder 121 to which start instructions by WOL using a LAN connection is given does not start. In this case, the TV receiver 131 can turn on the power of the recorder 121 connected via an HDMI cable using the HDMI-CEC function.

FIG. 2 is a flowchart showing the outline. Specifically, a magic packet is transmitted to the recorder 121 from the PC 111 [001]. The TV receiver 131 detects that a magic packet is transmitted via a LAN connection [002].

The TV receiver 131 checks the power-on of the recorder by means of polling [003]. If a notification that the power of the recorder 121 is turned on is not given for the period of optional polling times (until timeout) [004-YES], the TV receiver 131 turns on the power of the recorder 121 using the HDMI-CEC function via an HDMI cable [A] [005].

In this way, the power of the recorder 121 is turned on even if the personal computer (PC) 111 transmits a magic packet to turn on the power of the recorder 121; as a result, the power of the recorder 121 is not turned on.

If an apparatus starting the recorder 121 (turning on the power) is the STB 141, recording reservation is settable to the recorder 121 according to a program table acquired by the STB 141. In this case, if the STB 141 fails the start of the recorder 121 (power-on), the TV receiver 131 starts the recorder 121 using the HDMI-CEC function so that recording reservation is registered to the recorder 121.

More specifically, as shown in FIG. 3, when the PC 111 transmits a magic packet to the recorder 121 [sequence 01], the TV receiver 131 detects the transmission of a magic packet [sequence 01] by a LAN connection via a LAN cable [3] [sequence 02].

Then, the TV receiver 131 checks the power-on of the recorder 121 by means of polling [sequence 03].

If a notification that the power of the recorder 121 is turned on is given with respect to the polling [sequence 03], the TV receiver 131 repeats polling [sequence 0X] for the period of optional polling times (until timeout). The polling [sequence 0X] is repeated a predetermined number of times, and then, when polling reaches polling [sequence 0Y], it is checked that a start signal from the recorder 121 is not transmitted (WOL of the recorder 121 does not function).

In this case, the TV receiver 131 turns on the power of the recorder 121 using the HDMI-CEC function via an HDMI cable [A] [sequence 0Z].

In this way, the power of the recorder 121 is turned on even if the personal computer (PC) 111 transmits a magic packet to turn on the power of the recorder 121; as a result, the power of the recorder 121 is not turned on.

Figure 4:
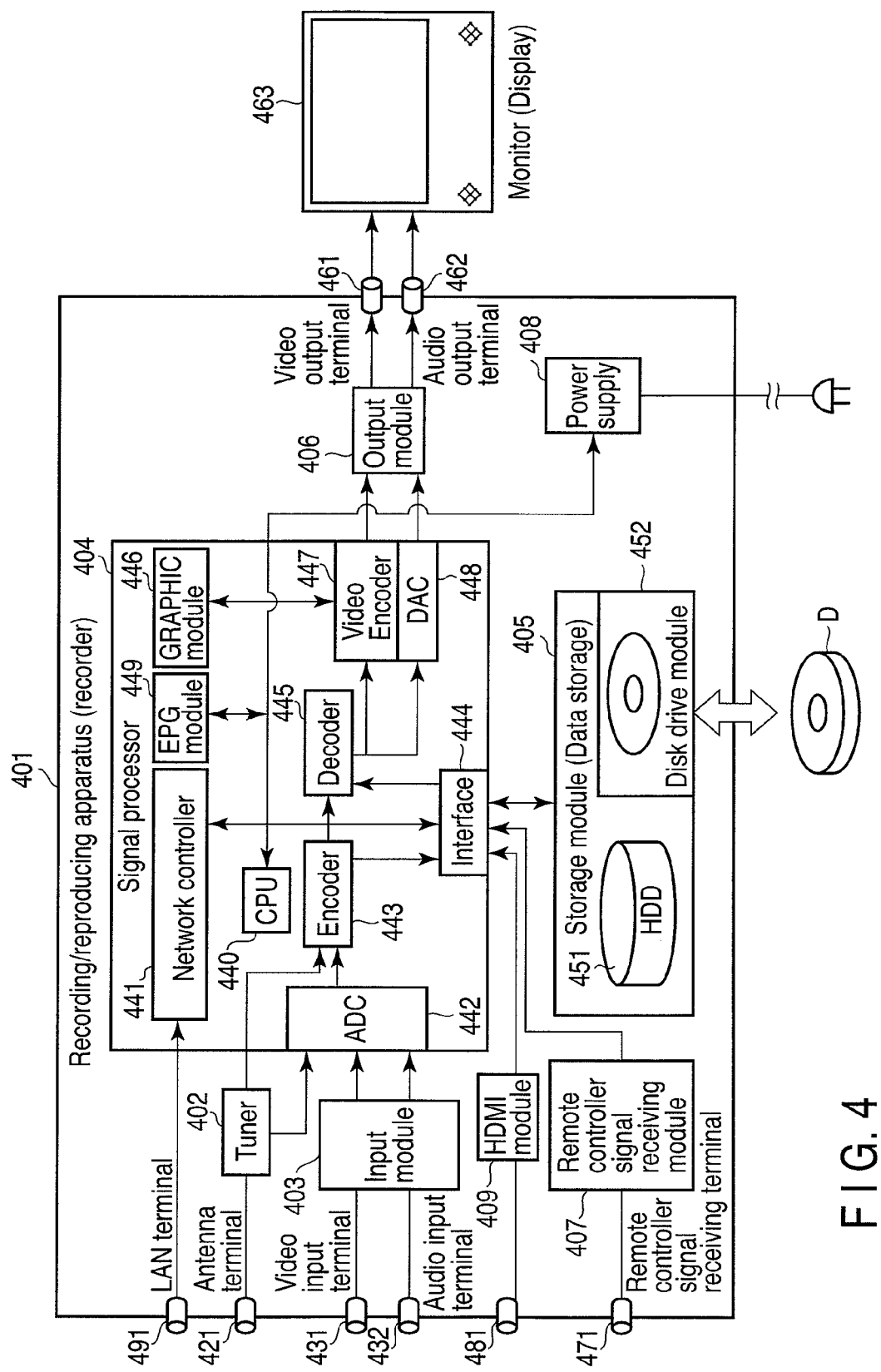
FIG. 4 is an exemplary diagram showing an example of a configuration of a recording/reproducing apparatus according to an embodiment.

FIGS. 4 and 5 are block diagrams showing each configuration applicable to recording/reproducing apparatus (recorder) and TV receiver, which are shown in FIG. 1.

A recorder 401 includes a tuner 402, an input module (an input circuit) 403, a digital signal processor (DSP) 404, a storage module 405, an output module (an output circuit) 406, a user operation input unit (remote controller signal receiving module) 407, a power unit 408 and an HDMI interface 409 (equivalent to HDMI port [2] shown in FIG. 1), at least.

The tuner 402 selects a channel, which broadcasts a recording target program, via an antenna connected to an antenna terminal 421 or an optical cable.

The input module 403 receives a video signal and an audio signal, which are input via a video input terminal 431 and an audio input terminal 432.

The DSP 404 includes a main controller (CPU) 440, a network controller 441, an analog-to-digital converter (ADC) 442, an encoder 443, an interface 444, a decoder 445, a user interface graphic processing module (Graphic module) 446, at least. Further, the DSP 404 includes a video encoder (video output processing unit) 447, a digital-to-analog converter (audio encoder (DAC)) 448 and an electronic program guide (EPG) processing module (EPG module) 449. In this case, the interface 444 is connected to the HDMI interface 409. The HDMI interface 409 may be connected to the network controller 441.

The main controller (CPU) 440 controls the operation of the foregoing elements and controls the on/off of a main power (except an internal control secondary circuit) of the power unit 408.

The network controller 441 receives a program having a stream format supplied from an external network via a LAN terminal 491. In this case, the LAN terminal 491 is connected to a relatively small-scale network (home local area network [LAN]) installed in an individual building) or a home server and a connection network. For example, the LAN terminal 491 is connected to an external network. Moreover, preferably, the home LAN or network is conforming to the digital living network alliance (DLNA) standard.

The analog-to-digital converter (ADC) 442 converts input analog video signal and audio signal into a digital signal, and then, supplies it to the encoder 443. Of course, if the tuner 402 receives a digital broadcasting, the output from the tuner 402 is intactly input to the encoder 443.

The encoder 443 converts (encodes) an input analog signal (video/audio) into a digital signal. In this case, the encoder 443 executes compression conforming to Moving Picture Experts Group (MPEG) 2 or 4 (H. 264-AVC), for example.

The interface 444 is used for data exchange with the storage module 405 or for an input of a control signal from the remote controller signal receiving module 407. The HDMI interface 409 is connected to a television receiver (video reproducer) 501 shown in FIG. 1 or an audiovisual (AV) amplifier (not shown) or a hub via an HDMI terminal 481. The AV amplifier is connected to a DVD recorder (not shown) and a DVD player (not shown), for example. The hub is connectable to an external apparatus such as an AV amplifier including an HDMI terminal, a personal computer (PC), a DVD recorder having a built-in hard disk drive (HDD) and a DVD player. In this case, if the HDMI terminal 481 is connected to a hub, the following connection and operation are executable. For example, one is a connection with a network such as Internet via a broadband router. The other is an operation of read, reproduction and write (recording) of a moving picture file (video data) and an audio file (audio data) between a personal computer (PC) on a network and a mobile phone (not shown) or a mobile terminal device (not shown) or a mobile terminal.

The decoder 445 decodes a program compressed into a MPEG-2 or MPEG-4 (H. 264-AVC).

The graphic module 446 outputs a graphical user interface screen display, which is displayed on a monitor 463 connected to a video output terminal 461 and an audio output terminal 462 via the output module 406.

The video encoder (video output processing unit) 447 synthesizes a video signal and a GUI screen display output from the graphic module 446 as the necessity arises. Then, the video encoder 447 generates an output video signal, and thereafter, supplies it to the output module 406 so that the monitor 463 connected to the video output terminal 461 displays the generated video signal.

The digital-to-analog converter (DAC [audio decoder]) 448 outputs an audio signal to the output module 406 so that an external speaker connected to the audio output terminal 462 reproduces the audio signal.

The EPG module 449 acquires EPG data transmitted together with a program in DBS digital broadcasting or terrestrial digital broadcasting or EPG data externally acquirable via the LAN terminal 491. For example, the EPG module 449 holds the EPG data as date, time, channel and program length data for displaying a program table used for program reservation in the graphic module 446. In this case, the acquired EPG data is stored in a memory device (not shown) or in a predetermined area of the HDD 451.

The storage module 405 includes the HDD 451 or a disk drive module 452, for example. The storage module 405 records a program with respect to an optical disk D conforming to the DVD standard, which is set to a hard disk of the HDD 451 or to the disk drive module 452, or reproduces an already recorded program. In this case, for example, a program is recorded in a semiconductor memory (memory card), or a reader/writer (not shown), which reproduces an already recorded program, may be prepared in addition to the disk drive module 452.

The output module 406 outputs a video signal from the video encoder 447 and an audio signal from the DAC 448 to a reproducer connected to the video output terminal 461 and the audio output terminal 462, for example, a monitor an a speaker.

The remote controller signal receiving module 407 inputs a user operation accepted by the remote controller signal receiver to the main controller 440 via the interface 444.

The main power of the power unit 408 is turned off according to the control of the main controller 440. The power unit 408 turns on the main power when a reserved time set in a timer (not shown) comes so that the foregoing various units are kept at an operable state.

FIG. 5 shows the configuration of a television receiver, which is applicable to the video display apparatus shown in FIG. 1.

A television receiver 511 includes a display 513, an audio reproducer 515, an operation module 517, a remote controller receiver 519 and a control block (controller) 560. Specifically, the display 513 displays a video corresponding to a video signal (video data). The audio reproducer 515 is an audio reproducer such as a speaker, and reproduces an audio output (audio data). The operation module 517 receives a control instruction (control input) signal from a user. The remote controller receiver 519 receives an operation (control input) signal by a remote controller R from a user. In this case, the display 513 is a liquid crystal panel device, for example. A backlight from an attached illuminator 525 is selectively selected, and thereby, the display 513 displays a video. Moreover, the illuminator 525 is lighted by means of a lighting module 527 using a predetermined drive voltage determined based on peripheral brightness and the difference between a continuously lighted time and a non-lighting time, that is, the temperature of the illuminator 525.

The controller 560 includes a main controller (main control large-scale IC [LSI]) 561 such as a CPU or main processing unit (MPU).

The controller 560 (main controller 561) controls the following various units (elements) in accordance with the following input data. One is an operation input from the operation module 517. Another is operation data sent from a remote controller R, that is, a (remote controller input) control signal received by the receiver 519. Another is data externally supplied via a network connection unit (communication interface) 573.

Further, the controller 560 includes a ROM 562, a RAM 563, a nonvolatile memory (NVM) 564 and a hard disk drive (HDD) 565. Specifically, the ROM 562 holds a control program executed by the main controller 561. The RAM 563 provides a work area for the main controller 561. The nonvolatile memory (NVM) 564 holds various setting data and control data or data externally supplied via the network connection unit 573 and data such as recording reservation data.

In this case, the NVM 564 holds a message captured via the network connection interface 573 and decoded schedule data via the controller 560.

The controller 560 is connected to the following optional interface groups. One is a card interface 571, which reads data from a semiconductor memory, that is, a card-like media (memory card) M and writing data to the memory card M. Another is a network connection unit (communication interface) 573. Another is an HDMI 574 (equivalent to the HDMI port [1] shown in FIG. 1). Another is a disk drive 575, which is used for reading data from an optical disk D, that is, moving picture data and audio data and for writing data to the optical disk D. Another is a USB interface 576 and an i.Link interface 577. Namely, the controller 560 functions as an external device suitable to the foregoing interfaces or a hub (expansion device) or a network controller.

The card interface 571 can read video and audio files from a memory card M loaded into a card holder 572. Moreover, the card interface 571 can write video and audio files to the memory card M.

The communication interface 573 is connected to a LAN terminal (port) 581. The communication interface 573 receives control data from a remote controller and moving picture data via an external device, for example, a mobile terminal device and a mobile PC (not shown) according to the Ethernet standard. In this case, the communication interface 573 is connected to a LAN-enabled hub, and thereby, it is connectable to an apparatus such as a LAN-enabled HDD (network attached storage [NAS]), a personal computer PC, and a DVD recorder having a built-in HDD.

The HDMI 574 is connected to the recorder (recording/reproducing apparatus) 401 or an audiovisual (AV) amplifier or a hub via an HDMI terminal 582. The AV amplifier is connected to a DVD recorder and a DVD player (not shown), for example. The hub is connectable to an external apparatus such as an AV amplifier including an HDMI terminal, a personal computer (PC), a DVD recorder having a built-in HDD and a DVD player. If the HDMI terminal 582 is connected to the hub, the following connection and operation are executable. For example, one is a connection with a network such as Internet via a broadband router. The other is an operation of read, reproduction and write (recording) of a moving picture file (video data) and an audio file (audio data) between a personal computer (PC) positioned on a network and a mobile phone (not shown) or a mobile terminal device (not shown) or a mobile terminal.

The disk drive 575 reads or writes data from or to an optical disk D conforming to the DVD standard, that is, moving picture data and audio data. Moreover, if a loaded optical disk conforms to the CD standard, the disk drive 575 reads audio data, and reproduces it, and further, outputs the data so that a music name and a playing time are displayable on a display 513.

The USB interface 576 is connectable to a hard disk drive (HDD), which is configured to make an access via a hub (not shown) connected to a USB port 584 and a keyboard. Therefore, the USB interface 576 is able to exchange data with various USB devices. Moreover, the USB interface 576 is connectable to a USB interface-enabled cellular phone, a digital camera, and a memory card-enabled card reader/writer, of course.

The i.Link interface 577 is serial-connectable to an external apparatus such as an audiovisual (AV) HDD or a Digital Video Home System (D-VHS) (not shown) or an externally attached tuner or a set-top box (STP [cable television receiver]). Therefore, the i.Link interface 577 is able to exchange data with an optionally connected apparatus.

Although detailed explanation is not made, for example, a network controller conforming to the Digital Living Network Alliance (DLNA) standard and Bluetooth (registered trademark) may be prepared in addition to the foregoing interfaces or in place of optional one or several interfaces. Thus, of course, via the network controller and Bluetooth, a recorder and a hard disk drive HDD, which are capable of exchanging data, or a portable terminal device may be connected.

The controller 560 includes a timer controller (timer module) 590. The timer module 590 manages data such as a time, a reservation time (date and time) for reserved recording set by the input from a user and a recording target channel, and holds the data. In this case, the timer module (timer control) 590 can always acquire "time data" called as a time offset table (TOT) in digital broadcasting received via a terrestrial digital tuner 550. In other words, the timer module 590 can perform the same time management as an apparatus having a built-in radio wave timer. Moreover, a time signal is required from a predetermined channel of analog broadcasting received by a terrestrial analog tuner 552 at a predetermined time everyday. Further, the timer module 590 functions as a timer with respect to data for performing a scheduler function supplied from a mobile terminal device and a messenger function. In this case, the timer module 590 to control power is turned on or is turned off with respect to a commercial power line by the power supply 591. In other words, under the situation that it is physically difficult to supply a current because a plug is pulled off, a secondary power (direct current [DC] 31, 24 or 5 V) to the controller 560 is usually secured except elements having relatively high power consumption such as the display 513 and the signal processing module 547 or the HDD. Of course, the display 513 and the signal processing module 547 or the HDD 565 is started at a predetermined time.

A satellite digital television broadcast signal received through a BS/CS (satellite wave) digital broadcast receiving antenna 542 is supplied to the satellite digital broadcast tuner 544 through an input terminal 543.

The tuner 44 selects a broadcast signal of a desired channel based on a control signal from the controller 560, and outputs this selected broadcast signal to a phase shift keying (PSK) demodulator 545.

The PSK demodulator 545 demodulates the broadcast signal selected by the tuner 544 based on the control signal from the controller 560 to obtain a transport stream (TS) including a desired program, and outputs the demodulated broadcast signal to a TS demodulator 546.

The TS demodulator 546 performs TS decoding processing with respect to a signal subjected to transport stream multiplexing based on a control signal from the controller 560, and outputs a digital picture signal and a digital audio signal of a desired program to the signal processing module 547. Further, the TS demodulator 546 outputs various kinds of data (service information) required to acquire a program (content) supplied based on digital broadcasting, electronic program guide (EPG) information, program attribute information (a program category or the like), subtitle information, and other information to the controller 560.

Moreover, a digital terrestrial broadcast signal received by a terrestrial broadcast receiving antenna 548 is supplied to the digital terrestrial broadcast tuner 550 through an input terminal 549.

The tuner 550 selects a broadcast signal of a desired channel based on the control signal from the controller 560, and outputs the selected broadcast signal to an orthogonal frequency division multiplexing (OFDM) demodulator 551.

The OFDM demodulator 551 demodulates the broadcast signal selected by the tuner 550 based on the control signal from the controller 560 to obtain a transport stream including the desired program, and outputs this stream to a TS demodulator 556.

The TS demodulator 556 performs TS decoding processing with respect to a signal subjected to transport stream (TS) multiplexing under control of the controller 560, and outputs a digital picture signal and a digital audio signal of a desired program to the signal processing module 547. It is to be noted that the signal processing module 547 acquires various kinds of data required to acquire a program superimposed on a digital broadcast wave and supplied in this state, electronic program guide (EPG) information, program attribute information (a program category or the like), and other information, and outputs such information to the controller 560.

An analog terrestrial television broadcast signal received by the terrestrial broadcast receiving antenna 548 is supplied to the analog terrestrial broadcast tuner 552 through the input terminal 549, thereby selecting a broadcast signal of a desired channel. The broadcast signal selected by the tuner 552 is demodulated into analog content, i.e., an analog picture signal and an analog audio signal by an analog demodulator 553, and then output to the signal processing module 547.

The signal processing module 547 selectively performs predetermined digital signal processing with respect to a digital picture signal and a digital audio signal respectively supplied from the PSK demodulator 545 and the OFDM demodulator 551, and outputs the processed signals to the graphic processing module 554 and the audio processing module 555.

To the signal processing module 547 are also connected a plurality of (four in the illustrated example) input terminals 540*a*, 540*b*, 540*c*, and 540*d*. These input terminals 540*a* to 540*d* enable inputting analog picture signals and analog audio signals from the outside of the television receiver 511.

The signal processing module 547 selectively digitizes the analog picture signals and the analog audio signals respectively supplied from the analog demodulator 553 and the input terminals 540*a* to 540*d*, carries out predetermined digital signal processing with respect to the digitized picture signals and audio signals, and then outputs the processed signals to the graphic processing module 554 and the audio processing module 555.

The graphic processing module 554 has a function of superimposing an OSD signal generated by an on-screen display (OSD) signal generation module 557 on a digital picture signal supplied from the signal processing module 547 and outputting an obtained signal. The graphic processing module 554 can selectively output an output picture signal from the signal processing module 547 and an output OSD signal from the OSD signal generation module 557, and can combine both the outputs so that each of the outputs constitutes a half of a screen and can output this combined output.

It is to be noted that the output OSD signal output from the OSD signal generation module 557 can be superimposed on the displayed moving picture in a "semitransparent" state (forming a part of a regular picture signal to be permeable) and output in this state when a parameter for $\alpha$ blending is set.

The graphic processing module 554 also performs processing of superimposing subtitle information on a picture signal based on a control signal from the controller 560 and the subtitle information when a broadcast signal has a subtitle signal attached thereto and a subtitle can be displayed. It is to be noted that the graphic processing module 554 supplies a moving picture message decoded in the high-function processor 580 or an image showing a scheduler function screen to the image signal processing module 558 through the controller 560.

A digital picture signal output from the graphic processing module 554 is supplied to the image signal processing module 558. The image signal processing module 558 converts the digital image signal fed from the graphic processing module 554 into an analog image signal in such a manner that this signal can be reproduced as an image (moving picture/still picture) output by the display 513, i.e., the monitor. Incidentally, it is needless to say that an extended projection device (a projector device) or an external monitor device may be connected as an external device with an output terminal 521 connected with the image signal processing module 558. Further, a DVD recorder device using, e.g., an optical disk conforming to a DVD standard as a recording medium or a video recorder device using a conventional video tape as a recording medium may be connected with the output terminal 521.

The audio processing module 555 is connected to an audio reproducer 515, i.e., a speaker or the like, and converts a digital audio signal supplied from the signal processing module 547 into an analog audio signal. It is to be noted that, although not explained in detail, a audio signal (an audio output) may be of course output to an external speaker connected with an output terminal 523, an audio amplifier (a mixer amplifier), or a headphone output terminal prepared as one conformation of the output terminal 523 in such a manner that this audio signal can be reproduced as an audio output.

In the controller 560, information for the scheduler function or the messenger function input to the high-function processor 580 through the communication I/F module 573 is checked for, e.g., double booking with respect to an already set recording reservation, clock time information provided by the timer module 590 and the NVM 564, a date and hour and a channel for a time order (a date order) in the scheduler function, and other factors.

As described above, according to this embodiment, even if the power is not turned on due to any reason when a magic packet is transmitted to turn on the power, an apparatus connected by means of an HDMI cable monitors a power state, and then, tunes on the power using an HDMI-CEC function.

The embodiments are not limited to the embodiments described above and can be modified in various manners without departing from the spirit and scope of the inventions. For example, the embodiment can provide a method of starting an apparatus on a network, including: detecting a transmission of a start command to a first apparatus, which is LAN-connected to a command supplier and whose power is turned on when receiving a start command; and starting the first apparatus using a bidirectional interface from an apparatus, which detects a transmission of a start command to the first apparatus when the first apparatus does not start.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video display apparatus comprising:
a display section configured to receive a video signal, and display video in accordance with the video signal; and
a controller configured to monitor a power supply section of a second external device with respect to whether the power supply section starts or not in response to a start command given from an external device within a first time period of time of detection of the start command from the external device to the power supply section, and also configured to give another start command to the power supply section via a bidirectional communication interface when the power supply section does not start within the first time period of the time of detection of the start command, the second external device comprising the power supply section and a record section configured to hold the video signal in accordance with which the video is displayed by the display section.

2. The apparatus of claim 1, wherein a first connection using a LAN cable is applied to detection of the start command from the external device to the power supply section of the second external device, and a second connection using the bidirectional communication interface is applied to giving of the start command to the power supply section and monitoring of the power supply section with respect to whether the power supply section starts or not within the first time period of the time of detection of the start command from the external device to the power supply section.

3. The apparatus of claim 1, wherein the start command includes a magic packet, which is defined by an operation system of the external device.

4. A recording/reproducing apparatus comprising:
a power supply section configured to start in response to a start command given from an external device, and start in response to another start command which is given by a monitor section of a second external device via a bidirectional communication interface when the power supply section does not start within a first time period of time of reception of the start command given from the external device, the monitor section being configured to monitor the power supply section within the first time period with respect to giving of the start command from the external device;
a record section configured to record a video signal and an audio signal, the record section being operated by power supplied by the power supply section; and
a controller configured to control recording of the video signal by the record section and supplying of the video signal held by the record section to the second external device, the controller being operated by power supplied from the power supply section.

5. The apparatus of claim 4, wherein a LAN cable is applied to connection of the apparatus to the external device, and an HDMI cable is applied as the bidirectional communication interface to connection of the apparatus to the second external device.

6. The apparatus of claim 4, wherein the start command includes a magic packet, which is defined by an operation system of the external device.

7. A system for starting an apparatus on a network, comprising:
a first apparatus configured to give a start command;
a second apparatus which comprises: a power supply section configured to start in response to the start command given from the first apparatus; a record section configured to record a video signal, the record section being operated by power supplied from the power supply section; and a controller configured to control recording of the video signal by the record section; and
a third apparatus which comprises: a controller configured to monitor the power supply section of the second apparatus with respect to whether the power supply section starts or not within a first time period of time of reception of the start command given from the first apparatus, and give another start command to the power supply section via a bidirectional communication interface when the power supply section does not start within the first time period of reception of the start command given from the first apparatus; and a display section configured to display video in accordance with the video signal output from the record section of the second apparatus.

8. The system of claim 7, wherein a LAN cable is applied to each of connection between the first apparatus and the second apparatus and that between the first apparatus and the third apparatus, and an HDMI cable is applied as the bidirectional communication interface to connection between the second apparatus and the third apparatus.

9. The system of claim 7, wherein the start command includes a magic packet, which is defined by an operation system of the first apparatus.

* * * * *